United States Patent [19]
Aklin, deceased et al.

[11] Patent Number: 4,494,829
[45] Date of Patent: Jan. 22, 1985

[54] CURVED FIELD PHOTOGRAPHIC OBJECTIVE

[76] Inventors: George H. Aklin, deceased, late of Fairport, N.Y.; Marie M. Aklin, Voluntary Administrator, 2 Woodside Rd., Fairport, N.Y. 14450

[21] Appl. No.: 420,581

[22] Filed: Sep. 20, 1982

[51] Int. Cl.³ .............................................. G02B 9/62
[52] U.S. Cl. .................................. 350/464; 350/412; 350/450
[58] Field of Search .................. 350/464, 412, 450

[56] References Cited
U.S. PATENT DOCUMENTS 3,370,905  2/1968  Hudson ............................... 350/464
3,802,765  4/1974  Vuijk .................................. 350/464

Primary Examiner—John K. Corbin
Assistant Examiner—Rebecca D. Gass

[57] ABSTRACT

The invention provides a highly corrected optical system comprising six groups consisting of ten elements, the indicies of refraction of which range from 1.654 to 1.807, the image surface being generally shallowly concave to the object.

2 Claims, 4 Drawing Figures

CURVED FIELD PHOTOGRAPHIC OBJECTIVE

BACKGROUND OF THE INVENTION

The invention relates to photographic objectives of moderate aperture and high correction particularly suitable for aerial photography.

SUMMARY OF THE INVENTION

The improved lens system of the invention consists of four elements in three components forward of the stop and six elements in three components rearwardly of the stop. The elements forward of the stop, in order from the object space, are a positive singlet, a positive cemented doublet and a negative singlet, all surfaces of which are concave to the stop. Rearwardly of the stop are, in order, a negative meniscus concave to the stop, a cemented doublet in the form of a meniscus convex to the stop of comprising a biconvex and a biconcave element, and a biconvex cemented triplet comprising a biconvex element, a positive meniscus and a negative meniscus, the two latter elements being concave to the stop.

This arrangement yields a lens having a relative aperture of f/2.8 and a semi-field of 25.5 degrees producing a substantially astigmatism-free image with extremely low chromatic aberration and low distortion. The very low lateral color achieved herein results from the careful choice of indices and dispersions of the glasses used. Lateral color is less than one Airy disc anywhere in the field. The image surface is quasispherical, the maximum departure from a plane being approximately 1.2 mm at 0.7 field. For a 6 inch focal length lens the theoretical radius of curvature which the film must assume is approximately 1237 mm, an amount readily achieved with a field-curving camera back, and which leaves no residual deformation in the film after exposure. The actual radius of film curvature and the film position are arrived at experimentally to assure that the film intersects the surface of best imagery.

U.S. Pat. Nos. 2,343,627 and 2,771,817 previously issued to this applicant show curved-field lenses but with much more flare surrounding the off-axis images. Astigmatism in the lens of the present invention is virtually zero, the maximum difference between the sagittal and tangential fields of 0.025 mm at 0.9 field, being reduced to zero at 25½ degrees field, and with greatly reduced flare surrounding the off-axis image. Previous attempts to reduce the flare in a curved field lens were unsatisfactory.

A curved field lens and camera has also been described in a paper by Hopkins et al before the Optical Society of America in October 1948, the abstract of which appears in the Journal of the Optical Society of America, Vol. 38, No. 12, Dec. 1948, page 1102.

Other features and additional objectives of the invention will become apparent from the following description of preferred embodiment as illustrated in the accompanying drawing.

Figure 1:
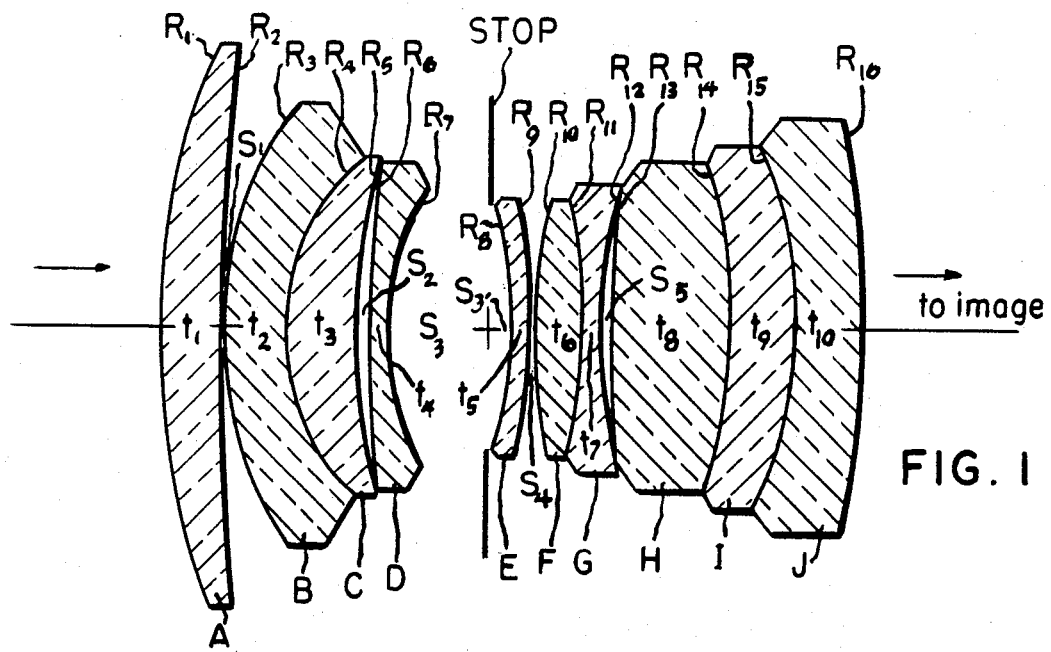
FIG. 1 is a conventional sectional view of the preferred embodiment of the lens
Figure 2:
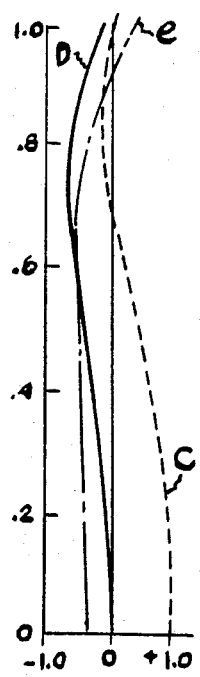
FIG. 2 shows the longitudinal spherical aberration for the lens for the C, D and e lines
Figure 3:
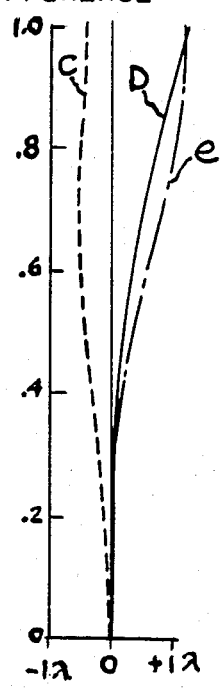
FIG. 3 shows the optical path difference for the C, D and e lines
Figure 4:
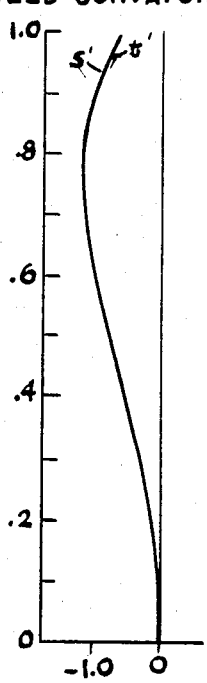
FIG. 4 shows the field curvature and the absence of astigmatism in the lens The arrangement of the components as illustrated in FIG. 1 shows the position of the aperture stop in addition to showing all the lens elements. The construction is hybrid, the front groups being derived from the gauss type of lens and the rear groups from the quadruplet type.

The refractive index $n_D$ and the Abbe number $v$, together with the radii, thicknesses and spacings are shown in Table 1.

TABLE I

EFL = 152.40 · REL. APERT. f. 2.8 BACK FOCUS = 84.74

| Element | radius | thickness & spacing | index $n_D$ | $v$ |
|---|---|---|---|---|
| A | $R_1 = +125.086$ | $t_1 = 10.616$ | 1.74931 | 35.0 |
|   | $R_2 = +442.245$ | $S_1 = .25$ | | |
| B | $R_3 = +65.984$ | $t_2 = 9.81$ | 1.67252 | 32.2 |
|   | $R_4 = +36.141$ | | | |
| C | $R_5 = +104.861$ | $t_3 = 12.205$ | 1.74500 | 46.4 |
|   |   | $S_2 = *$ | | |
| D | $R_6 = +221.868$ | $t_4 = 2.80$ | 1.69875 | 30.1 |
|   | $R_7 = +46.207$ | $S_3 = 17.327$ to stop | | |
|   |   | $S_3' = 3.60$ stop to lens | | |
| E | $R_8 = -78.372$ | $t_5 = 2.77$ | 1.74931 | 35.0 |
|   | $R_9 = -93.697$ | $S_4 = .25$ | | |
| F | $R_{10} = +94.767$ | $t_6 = 7.75$ | 1.74500 | 46.4 |
| G | $R_{11} = -104.131$ | $t_7 = 2.53$ | 1.65429 | 33.7 |
|   | $R_{12} = +87.238$ | $S_5 = **$ | | |
| H | $R_{13} = +280.987$ | $t_8 = 19.368$ | 1.80785 | 40.7 |
| I | $R_{14} = -91.070$ | $t_9 = 10.914$ | 1.70166 | 41.0 |
| J | $R_{15} = -71.562$ | $t_{10} = 11.206$ | 1.71686 | 48.0 |
|   | $R_{16} = -184.989$ | | | |

*Edge contact at 26.5 mm semi aperture
**Edge contact at 22.0 mm semi aperture

The unusually high state of correction results from a number of factors including the use of high index glasses, none of the elements having an index lower than 1.654. Most of the glasses have relatively low dispersions for their index of refraction, the highest dispersion glass being Schott SF15 with a V-number of 30.1 used in meniscus element D. Another factor is the use of a majority of surfaces which are concave to the stop. All elements forward of the stop are concave to the stop, while all but two surfaces behind the stop are concave to the stop. Still another factor is the relatively shallow curvature of the surfaces immediately before and behind the stop, $r_7$ and $r_8$. In conventional lenses these radii are far steeper, as for example in the conventional double gauss lens in which the ratios of the radii of the forward and rearward surfaces adjacent the stop to the focal length of the objective are almost always between 0.29 and 0.40 respectively. In the present invention the ratios of $r_7$ and $r_8$ are 0.303 and 0.514 respectively.

An additional feature is the +, +, − arrangement of the rear cemented triplet in which the biconvex element H has considerably higher index relative to meniscus element I, but with almost the same dispersion. The triplet can be separated at the last cemented surface with good results, but it has been found equally good or better results are achieved by cementing the last element with the additional advantage of simplifying manufacture. It should also be noted that the axial glass path is usually large; approximately 78% of the distance from the front vertex to the rear vertex is through glass. At the edge of the 25.5 degree semi field the illumination is 31.34%.

It is obvious from the disclosure given above that variations and modifications of the given example will suggest themselves to those skilled in the art.

What is claimed is:

1. In a six-component, ten-element photographic objective, a first lens section forward of the aperture stop comprising a singlet, a doublet and a singlet in order from the long conjugate, and a second lens section rearward of the aperture stop said rearward section consisting, in order from the stop, of a negative singlet concave to the stop, a doublet in the form of a meniscus with its outer surfaces convex to the stop and comprising a biconvex element and a biconcave element with the cemented surface concave to the stop, and a biconvex triplet comprising a biconvex element and two menisci, said biconvex element having a higher index of refraction than said menisci, the cemented surfaces within said biconvex triplet being concave to the stop.

2. A photographic objective as claimed in claim 1, wherein the elements have the following values

| EFL = 152.40 REL. APERT. f/2.8 BACK FOCUS = 84.74 | | | | |
|---|---|---|---|---|
| Element | radius | thickness & spacing | index $n_D$ | $\nu$ |
| A | $R_1 = +125.086$ | $t_1 = 10.616$ | 1.74931 | 35.0 |
|  | $R_2 = +442.245$ | $S_1 = .25$ |  |  |
| B | $R_3 = +65.984$ | $t_2 = 9.81$ | 1.67252 | 32.2 |
|  | $R_4 = +36.141$ |  |  |  |
| C | $R_5 = +140.861$ | $t_3 = 12.205$ | 1.74500 | 46.4 |
|  |  | $S_2 = *$ |  |  |
| D | $R_6 = +221.868$ | $t_4 = 2.80$ | 1.69875 | 30.1 |
|  | $R_7 = +46.207$ | $S_3 = 17.327$ to stop $S_3' = 3.60$ stop to lens |  |  |
| E | $R_8 = -78.372$ | $t_5 = 2.77$ | 1.74931 | 35.0 |
|  | $R_9 = -93.697$ | $S_4 = .25$ |  |  |
| F | $R_{10} = +94.767$ | $t_6 = 7.75$ | 1.74500 | 46.4 |
|  | $R_{11} = -104.131$ |  |  |  |
| G | $R_{12} = +87.238$ | $t_7 = 2/53$ | 1.65429 | 33.7 |
|  |  | $S_5 = **$ |  |  |
| H | $R_{13} = +280.897$ | $t_8 = 19.368$ | 1.80785 | 40.7 |
|  | $R_{14} = -91.070$ |  |  |  |
| I | $R_{15} = -71.562$ | $t_9 = 10.914$ | 1.70166 | 41.0 |
| J | $R_{16} = -184.989$ | $t_{10} = 11.206$ | 1.71686 | 48.0 |

*Edge contact at 26.5 mm semi aperture
**Edge contact 22.0 mm semi aperture where $\nu$ is the abbe number of the glass.

* * * * *